(12) United States Patent
Chanson et al.

(10) Patent No.: US 8,841,877 B2
(45) Date of Patent: Sep. 23, 2014

(54) POWER SUPPLY SYSTEM AND METHOD FOR CONTROLLING ELECTROCHEMICAL CELL CHARGING

(75) Inventors: Claude Chanson, Jarnac (FR); Antoine Juan, Champniers (FR)

(73) Assignee: Saft Groupe SA, Bagnolet (FR)

( * ) Notice: Subject to any disclaimer, the term of this patent is extended or adjusted under 35 U.S.C. 154(b) by 485 days.

(21) Appl. No.: 12/750,069

(22) Filed: Mar. 30, 2010

(65) Prior Publication Data

US 2010/0253277 A1    Oct. 7, 2010

(30) Foreign Application Priority Data

Apr. 3, 2009   (FR) ...................................... 09 01634

(51) Int. Cl.
*H01M 10/44*    (2006.01)
*H02J 7/35*    (2006.01)
(52) U.S. Cl.
CPC ...................................... *H02J 7/35* (2013.01)
USPC ............................ 320/101; 320/132; 320/149
(58) Field of Classification Search
USPC ........................................................ 320/101
See application file for complete search history.

(56) References Cited

U.S. PATENT DOCUMENTS

| | | | |
|---|---|---|---|
| 5,869,949 A | 2/1999 | Nishikawa et al. | |
| 7,072,871 B1 * | 7/2006 | Tinnemeyer | 320/132 |
| 2005/0083018 A1 * | 4/2005 | Morrow | 320/128 |
| 2007/0222412 A1 | 9/2007 | Maloizel et al. | |
| 2007/0247106 A1 * | 10/2007 | Kawahara et al. | 320/104 |
| 2008/0074082 A1 * | 3/2008 | Tae et al. | 320/136 |
| 2008/0245672 A1 * | 10/2008 | Little et al. | 205/555 |

FOREIGN PATENT DOCUMENTS

| | | |
|---|---|---|
| DE | 10 2005 036157 A1 | 2/2007 |
| EP | 1 848 087 A2 | 10/2007 |

OTHER PUBLICATIONS

European Search Report, issued in connection with European Patent Application No. 10 15 7437, dated Aug. 11, 2010.
International Search Report for FR 0901634 dated Nov. 10, 2009.

* cited by examiner

*Primary Examiner* — Edward Tso
*Assistant Examiner* — Johali Torres Ruiz
(74) *Attorney, Agent, or Firm* — Sughrue Mion, PLLC

(57) ABSTRACT

An electrical power supply system is provided comprising a number of rechargeable cells, a number of control electronics circuits and a charger which consists of apparatus for producing electricity from a renewable energy source, the electrochemical cells being divided into separate branches connected in parallel to the charger. Each control electronics circuit controls the charging of one branch by measuring a current being applied to the branch, integrating the current measured in the branch, determining a state of charge of the cell or cells of the branch, comparing the integrated current value with a set value set as a function of the determined state of charge, and interrupting the passage of current being applied to the branch when the integrated current reaches the set value. This system makes it possible to optimize the sharing out of charging current between parallel branches of battery cells while being adaptable as regards the number of cells used in parallel in the system.

13 Claims, 4 Drawing Sheets

POWER SUPPLY SYSTEM AND METHOD FOR CONTROLLING ELECTROCHEMICAL CELL CHARGING

BACKGROUND OF THE INVENTION

The present invention relates to electrical power supply systems comprising electrochemical storage cells and a charger made up by apparatus for producing electricity from a renewable energy source, such as photovoltaic cell panels, wind turbines or hybrid apparatus in which these two sources are associated. The invention relates more particularly to the control of charging of electrochemical cells which are supplied by apparatus for producing electricity from a renewable energy source.

Typically, a battery consists of a plurality of electrochemical cells also called secondary cells or elements, connected together in series and/or parallel. Each electrochemical cell discharges while supplying electrical power to a given application. Each electrochemical cell can be charged by a charger which supplies electrical energy to its terminals to increase the amount of electrical energy stored therein. For certain applications, notably outdoor applications not connected to an electrical supply network, the charger can be a panel of photovoltaic cells, one or more wind turbines, or hybrid apparatus.

In a battery, internal resistance of an electrochemical cell can vary from one cell to another. As a consequence, charging current can vary from one branch to the other of cells connected in parallel. Charging is consequently not uniform over all the cells of the battery. This problem of balancing charge between parallel cells in a battery is well-known.

European patent application EP-A-1,848,087 discloses an apparatus and method for balancing charging current between several electrochemical cells connected in parallel. This document proposes the use of a charge controlling unit on each parallel branch of electrochemical cells. Each control unit is adapted to measure the current entering the branch and to integrate this current over a period of time. When the integrated current exceeds a set value, charging current for this branch is interrupted.

The apparatus described in EP-A-1,848,087 is not directly applicable to the case where the charger is made up by apparatus for producing electricity from a renewable energy source. For instance, to take the case of a charger made up by a photovoltaic solar panel, delivered current varies considerably as a function of solar illumination of the panel and the source can be limited in energy. It is consequently necessary to ensure good optimization of charging current distribution. This is also the case with a charger constituted by a wind turbine or hybrid apparatus.

The apparatus disclosed in EP-A-1,848,087 solely sets out to balance the charge between the various parallel branches of the battery in order to avoid any overcharging of certain cells. But this document does not attempt to optimize the energy supplied by the charger in order to best distribute it over the various branches. The apparatus described in that document does not take into consideration the state of charge (SOC) of each cell.

Now, the problem of how to optimize the sharing out of energy supplied by a charger is real when the charger is not connected to an electrical network but rather to a source of limited power, which can be the case when the charger is made up by photovoltaic solar panels and/or wind turbines. Power available from such a charger is limited, in quantity and in time.

The graph in FIG. 1 illustrates this problem of sharing out of charging current between parallel connected cells. To facilitate understanding, the charger considered is a photovoltaic solar panel. Nevertheless, the discussion below also applies to the case where the charger is a wind turbine or hybrid apparatus. The graph in FIG. 1 shows how temperature and current is varying over time in three branches of cells connected in parallel, but it will be understood that the problem of how to share out charging current appears as soon as two cells are connected in parallel, the problem being accentuated by the number of branches in parallel.

The curves in the lower half of the graph show how current is changing over a given period (for instance one day) and the curves in the top half of the graph show how temperature in the cells is varying over the same period of time. The curve Ipv represents current supplied by the photovoltaic solar panel (the charger) and the curves I1, I2, and I3 respectively show the currents passing in each one of the three branches of electrochemical cells connected in parallel. The curves T° 1, T° 2 and T° 3 respectively show temperature in the electrochemical cells of the three branches.

The graph in FIG. 1 does indeed show that the charging current Ipv does vary considerably depending on the degree of solar illumination. The graph in FIG. 1 also shows two phases during charging:

Phase 1: the current Ipv supplied by the photovoltaic solar panel is distributed between the three branches of electrochemical cells. The difference between the currents passing in each branch depends on the internal resistance of the cells of each branch. In FIG. 1, the first branch is taking more current than the other branches (I1>I2 and I1>I2); the cells of the first branch consequently get charged more rapidly and temperature curve T° 1 indicates that this first branch of electrochemical cells is heating up as the end of charging is approached. The cells of the two other branches remain at ambient temperature and have been charged much less than the cells of the first branch.

Phase 2: the current Ipv supplied by the solar panel is diminishing (at the end of the day or cloudy conditions). The curve for current I1 indicates that the first branch is grabbing all the current even though the cells of this branch are sufficiently charged. Temperature curve T° 1 shows that this overcharging current I1 is being lost through heating up.

When the charger is connected to an electrical network—with no limitation on power available—charging current does not diminish like that in the graph of FIG. 1. Those cells which are already charged can evacuate the overcharging current as heat through heating up while the cells of the other branches finish their charging.

FIG. 1 is a good illustration of the difficulty of, firstly, sharing out charging between several parallel branches of electrochemical cells and, secondly, of making best use of the current supplied by a photovoltaic solar panel. This consideration is equally true where the charger is a wind turbine or hybrid apparatus.

Typically, for electrical power supply systems employing a charger consisting of apparatus for producing electricity from a renewable energy source, an electronic device for controlling charging is employed. FIG. 2 is a diagrammatic illustration of such an electrical power supply system with a centralized electronic control device. Such a system is known, notably the one commercially available from Helios Technology® or Phocos®.

FIG. 2 shows a charger 2 consisting of apparatus for producing electricity from a renewable energy source, electrochemical cells 3 and a central controller 14. Central controller 14 manages charging of the electrochemical cells 3 as well as their discharge in an external application 5. In such an electrical power supply system 1, control of the electrochemical cells 3 is managed by a single centralized control 14 which distributes charging current between the various branches, using switches for instance, as a function of measurements performed on the cells. Central controller 14 needs to be dimensioned to correspond to the number of electrochemical cells 3 in the system 1. If it is desired to add or remove a cell in parallel, it is then necessary to reconfigure central controller 14. This obligation to reconfigure the system when the number of electrochemical cells changes is commercially disadvantageous with electrical power supply systems using a charger consisting of apparatus for producing electricity from a renewable energy source.

U.S. Pat. No. 5,635,816 discloses apparatus and a method for regulating battery charging current as a function of its SOC. The charger is a photovoltaic cell array. Charging current is a pulse width modulation signal. Pulse width depends on the battery SOC determined from the voltage at its terminals. This patent does not describe charging current balancing between different parallel branches of electrochemical cells. Further, the apparatus disclosed in this document is centralized apparatus which cannot be adapted in modular fashion to the number of cells connected in parallel in the battery.

U.S. Pat. No. 6,081,104 discloses apparatus and a method for regulating a battery charging current as a function of its SOC. The charger can be a photovoltaic panel or a wind turbine. The charging current is a pulse width modulated signal. Pulse width depends on the voltage at the battery terminals. This document does not describe balancing of charging current between the various parallel branches of electrochemical cells. Further, the apparatus described in this document consists of centralized apparatus which cannot be adapted in modular fashion depending on the number of cells connected in parallel in the battery.

US-A-2007/0246943 also discloses apparatus and a method for regulating charging current of a battery as a function of its SOC. The charger is a wind turbine. Charging current is a pulse width modulated signal. Pulse width depends on the SOC determined from current entering and leaving the battery. This document does not describe the balancing of charging current between different parallel branches of electrochemical cells. Further, the apparatus described in this document consists of centralized apparatus which cannot be adapted in modular fashion to the number of cells connected in parallel in the battery.

There is consequently a need for an electrical power supply system that uses a charger made up by apparatus for producing electricity from a renewable energy source which makes it possible to optimize the sharing out of charging current between the parallel branches of electrochemical cells and which can be adapted in modular fashion to the number of cells used in parallel in the system.

SUMMARY OF THE INVENTION

To this end, the invention proposes providing one electronic control circuit per parallel branch of electrochemical cells in the system; it is thus possible to adapt the system in modular fashion depending on requirements of the application without having to reconfigure the central electronics. Additionally, according to the invention, each electronic control circuit is responsible for controlling charging as a function of the SOC of the cells of its branch in order to make optimal use of the limited energy available from the charger.

More particularly, the invention provides an electrical power supply system comprising a plurality of electrochemical cells, a plurality of control electronics circuits and a charger made up by apparatus for producing electricity from a renewable energy source, the electrochemical cells being divided into at least two branches connected in parallel to the charger, each control electronics circuit being adapted to control the charging of one branch, each control electronics circuit comprising:
  a means for measuring current being applied to the branch,
  a means for integrating the current measured,
  a means for determining a state of charge of the electrochemical cell or cells of the branch,
  means for comparing the integrated current value with a set value set as a function of the state of charge determined,
  means for interrupting the passage of current being applied to the branch when the integrated current reaches the set value.

In preferred embodiments, the electrical power supply system can include one or several of the following characteristics:
  the charger comprises at least one photovoltaic cell panel;
  the charger comprises at least one wind turbine;
  each charging control electronics circuit is integrated into a housing containing the electrochemical cell or cells of the branch with which it is associated;
  the set value for each branch is set as a function of characteristics of the charger;
  each control electronics circuit further includes means for determining the state of health of the electrochemical cell or cells of the branch with which it is associated;
  each control electronics circuit further includes a means for communicating with a system management circuit;
  the electrochemical cells are of the nickel metal hydride (Ni-MH) type;
  the electrochemical cells of the nickel cadmium (Ni—Cd) type.

The invention further provides a method for controlling charging of a plurality of electrochemical cells distributed into at least two branches connected in parallel to a charger consisting of apparatus for producing electricity from a renewable energy source, the method comprising the steps of:
  measuring a current being applied to each branch,
  integrating the current measured in each branch,
  determining a state of charge of the electrochemical cell or cells of each branch,
  comparing, for each branch, the value for integrated current with a set value set as a function of the determined state of charge,
  adapting, for each branch, a duration of interruption of passage of current in the branch as a function of the set value.

In preferred embodiments, the method for controlling charging can include one or several of the following characteristics:
  the charger comprises at least one photovoltaic cell panel;
  the charger comprises at least one wind turbine;
  the set value in each branch is set as a function of characteristics of the charger.

Further characteristics and advantages of the invention will become more clear from reading the detailed description which follows of some embodiments of the invention, provided solely by way of example, with reference to the attached drawings.

DETAILED DESCRIPTION OF PREFERRED EMBODIMENTS

The invention provides an electrical power supply system employing a charger made up by apparatus for producing electricity from a renewable energy source. The system of the invention has decentralized charge monitoring at each electrochemical cell parallel branch. The number of cell branches can thus vary from one application to the other without requiring modification to the system. The system of the invention further provides current regulation of charging taking account of the SOC of each electrochemical cell branch. This provides for optimization of the limited power from the source constituting the charger.

Figure 2:
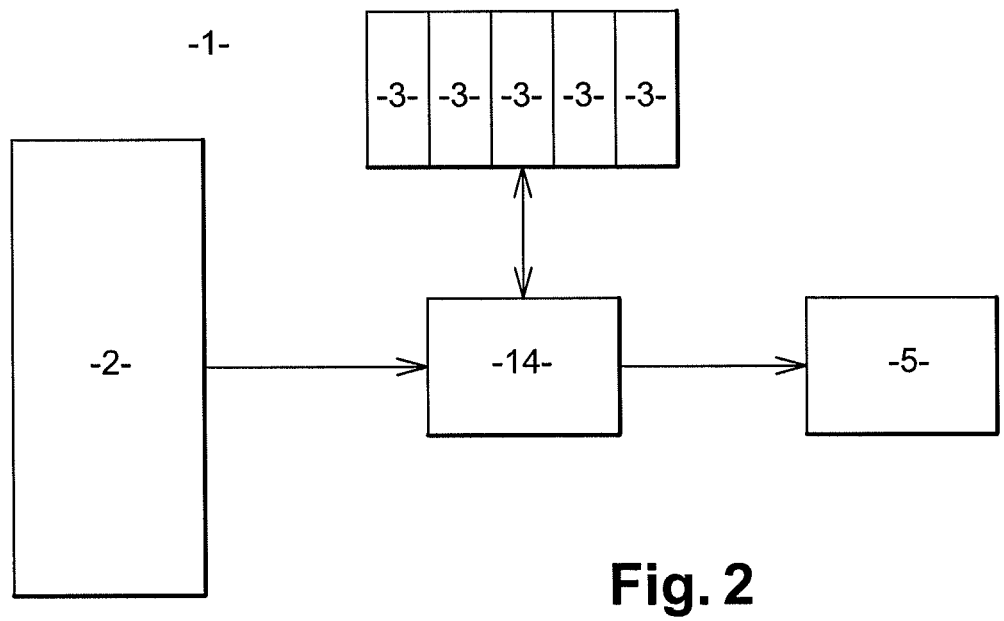
FIG. 2, already described, is a block diagram of a prior art system.
Figure 3:
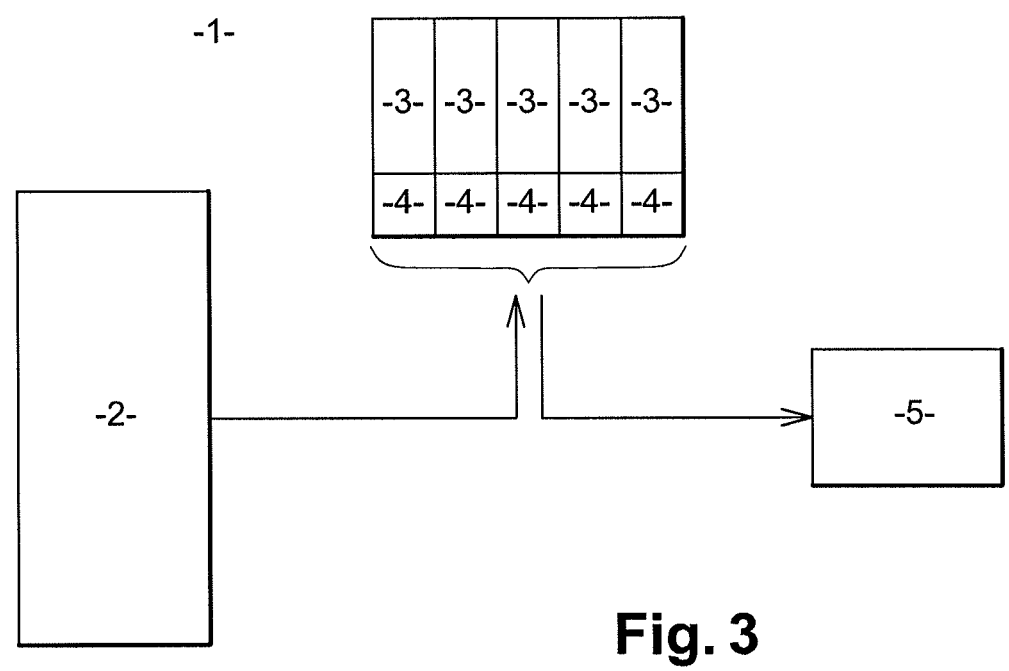
FIG. 3 is a block diagram of the system according to the invention.

The invention will be better understood by referring to FIG. 3. FIG. 3 shows diagrammatically a system 1 according to the invention. Those parts that are identical to those described with reference to FIG. 2 are identified by the same reference numerals. Unlike the prior art system shown in FIG. 2, the system 1 of the invention includes control electronics 4 associated with each branch of electrochemical cells 3. One branch of cells 3 can have one single cell or a plurality of series connected cells. To simplify the description, we shall suppose there is one electrochemical cell 3 per parallel branch.

The system 1 consequently comprises a plurality of control electronics circuit 4 each associated with one cell 3. Each control electronics circuit 4 consequently monitors the charge in the electrochemical cell 3 of its branch by the current originating from charger 2. Each control electronics circuit 4 also provides the interface with the external application 5. For example, each control electronics circuit 4 can be integrated into an electrochemical cell 3 casing. Thus, each supplementary electrochemical cell 3, added in parallel to the battery of the system, will be introduced with its own control electronics circuit 4. In this way, problems of dimensioning and configuration associated with a central controller are avoided.

For example, for application to a network of atmospheric measurements, the energy necessary can vary as a function of a number of sensors to be electrically powered and the power of the antenna for transmitting the data. Now, the number of sensors and the antenna power can vary depending on the geographic region. Thus, for a given customer wishing to install such a network (in the eyes of the customer, the same product), energy requirements can vary considerably from one installation to another. The system of the invention makes it possible to provide electrical powering of each installation in modular fashion: if a particular geographic site requires two branches of electrochemical cells in parallel, the system of the invention will provide these two branches with two associated control electronics and one, wind or hybrid, photovoltaic charger; while if another geographic site requires one single or three electrochemical cell branches in parallel, the system according to the invention will provide the branch or branches of cells and associated control electronics with one charger, without the configurations of the electronics being different to that of the first geographic site. Further, if a customer needs more power at a given geographic site, for example as a result of adding more sensors or by using a more powerful replacement antenna, it is possible to simply add one branch to the system without modifying the existing installation. This example is given solely by way of illustration. A further example having the same constraints and to which the system of the invention procures the same advantages can be that of a telecommunications network the energy requirements of which vary from one geographic site to another depending on the power of the antennas to be powered.

Figure 6:
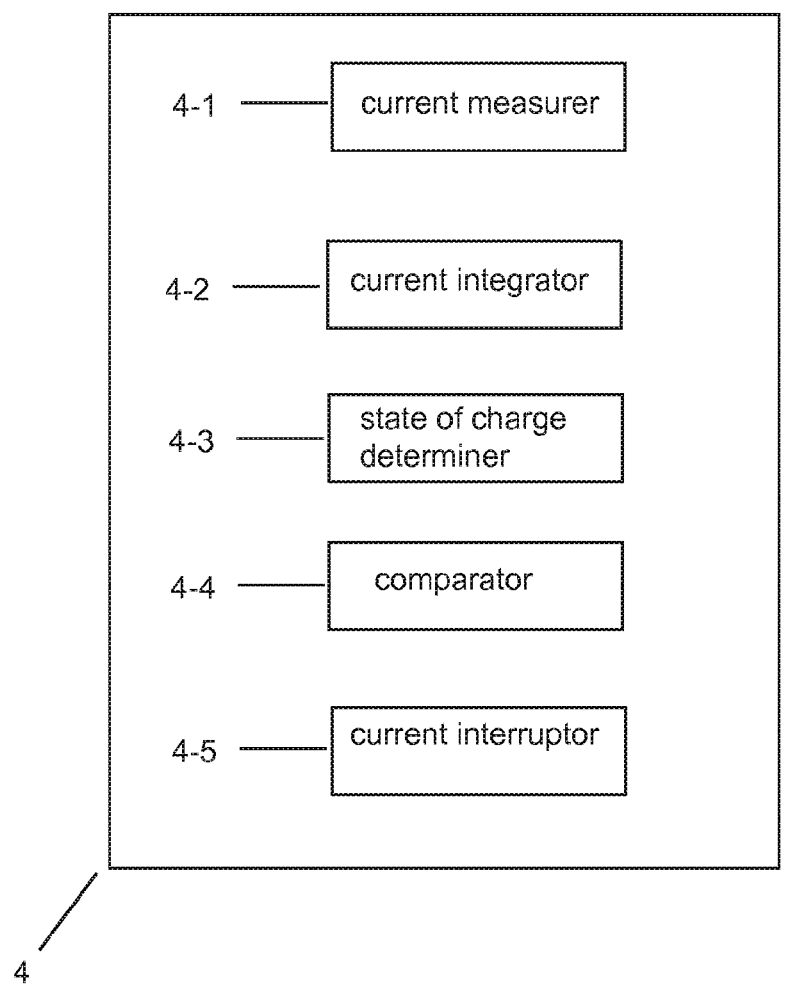
FIG. 6 shows the control electronics circuit according to the invention.

We shall now describe the control electronics 4 for each branch of cells 3 in more detail with the aid of FIG. 6. Each control electronics circuit 4 includes at least one means of measuring the current passing through the electrochemical cell 3 with which it is associated (e.g., a current measurer 4-1); a means for integrating the current measured in order to determine a mean current passing through the cell 3 (e.g., a current integrator 4-2); a means for interrupting flow of current in the electrochemical cell 3 when the integrated current has reached a set value I (e.g., a current interruptor 4-5); a means for determining the state of charge of the electrochemical cell 3 (e.g., a state of charge determiner 4-3); and a means comparing the value of integrated current with a set value I (e.g., a comparator 4-4).

The means for determining the SOC of the cell 3 depends on the type of cell. For certain electrochemical cells, such as Ni-MH or Ni—Cd the SOC can be determined by measuring the currents entering and leaving the cell (for example with an amp-hour meter). In effect, in these types of cells, measuring terminal voltage of the cell is not appropriate for determining SOC, as a voltage plateau is reached while the electrochemical cell is still not charged. Thus, the control electronics 4 can determine the SOC of the Ni-MH or Ni—Cd type cells depending on the currents entering and leaving the cell 3.

The set value I of integrated current is determined as a function of the SOC of the cell 3, as will be discussed in detail below with reference to FIGS. 4 and 5. This set value I for integrated current can also be set as a function of the characteristics of the charger 2. For example, to take the case where the charger 2 is a photovoltaic cell panel, the set value can be adapted to the power of the solar panel in order to optimally share out the charging current supplied by the photovoltaic cell panel.

Each control electronics circuit 4 can also include other electronic functions, such as temperature sensors, means for determining the state of health (SOH) of the electrochemical cell 3, and means for communicating with a system manager.

The invention also provides a method for controlling the charging of a plurality of electrochemical cells 3 distributed in at least two parallel connected branches to a charger 2 constituted by apparatus for producing electricity from a source of renewable energy such as a panel of photovoltaic cells, a wind turbine, or a hybrid device.

Figure 4:
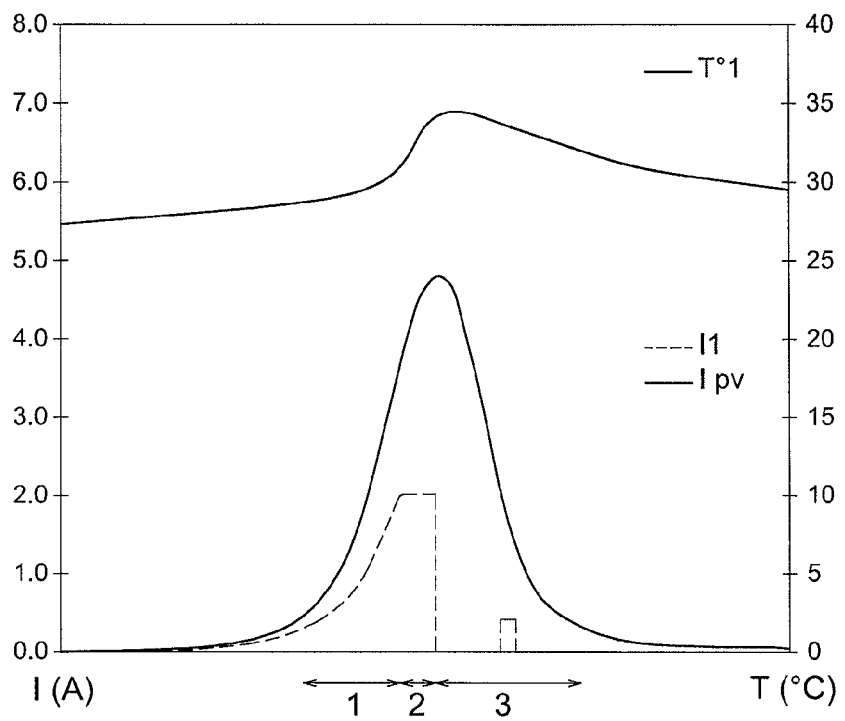
FIG. 4 shows measurements acquired for one branch in a system according to the invention.
Figure 5:
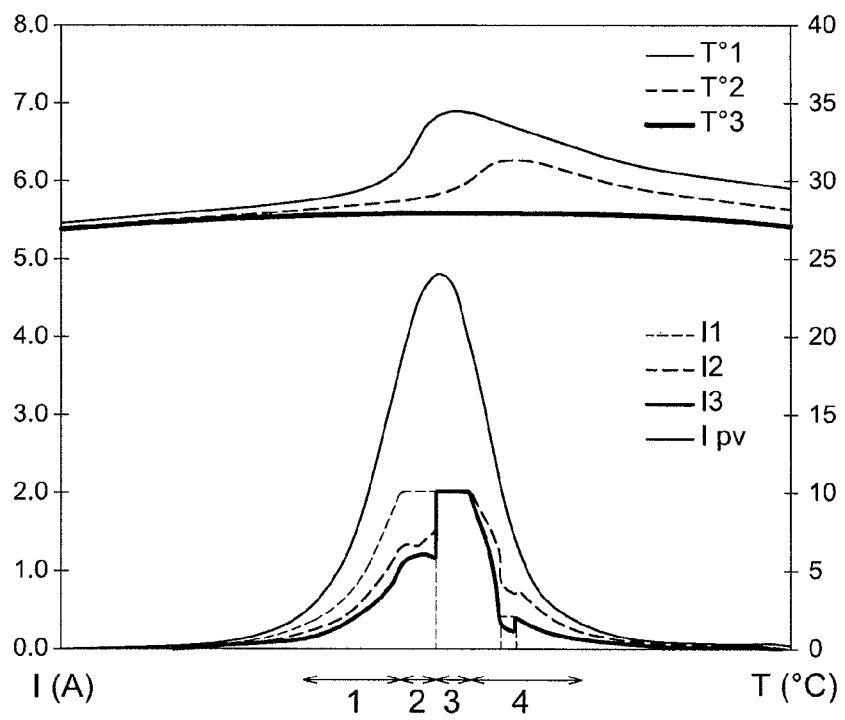
FIG. 5 shows measurements acquired on three branches in a system according to the invention.

The method of the invention and the operation of the system 1 according to the invention will be better understood by referring to FIGS. 4 and 5.

In order to facilitate understanding of the method and system according to the invention, we shall limit the description to the case where the charger is a solar panel. It will be understood that this example is not limiting and that the charger can be other apparatus for producing electricity from a renewable energy source, such as a wind turbine or hybrid apparatus.

FIG. 4 illustrates how the set value I is determined as a function of the SOC of an electrochemical cell. Just like FIG.

3, the curves in the lower portion of the graph show variations in current throughout the day. The curve Ipv shows variations in the current supplied by the solar panel. One single curve I1 is shown for a given electrochemical cell. The top portion of the graph shows variations in cell temperature throughout the day. The graph in FIG. 4 describes three phases in the operation of the system according to the invention:

phase 1: the current Ipv supplied by the solar panel is employed for charging the electrochemical cell. The temperature curve shows that the cell is heating up and is approaching its end of charging state. The cell controller consequently sets the set value at 2 A in the example illustrated. This set value will obviously depend on the state of charge of the cell.

Phase 2: cell charging passes over to a 2 A regulated mode. Regulating cell current to 2 A limits the heating up of the cell. When in regulated mode, a switch on the controller adapts the on/off durations of a switch allowing or preventing passage of charging current. Such regulation is for example described in EP-A-1 848 087 discussed above.

Phase 3: the cell is coming to the end of charging. Charging current is stopped. Heating up is mastered and temperature drops again progressively. The controller for the cell now adapts the set value (to 0.5 A in the example illustrated) to simply provide trickle charging.

The system 1 of the invention consequently provides, for each branch of electrochemical cells 3 connected in parallel to the charger 2, control electronics 4 which are adapted to:

measure the current being applied to the electrochemical cell 3, integrate this current measured with respect to time, determine the state of charge (SOC) of the electrochemical cell 3;

compare the value of the integrated current to that of the set value I established as a function of the determined state of charge, adapt durations during which passage of current is interrupted in the generator as a function of the set value I.

As indicated previously, this set value I can also take account of the characteristics of the charger 2 in addition to the state of the cell 3. For instance, to take the case where the charger 2 is a solar panel, where the power being supplied is low, the control electronics 4 can reduce the set value I, thereby allowing the current to be shared out over the branches of the system.

Figure 1:
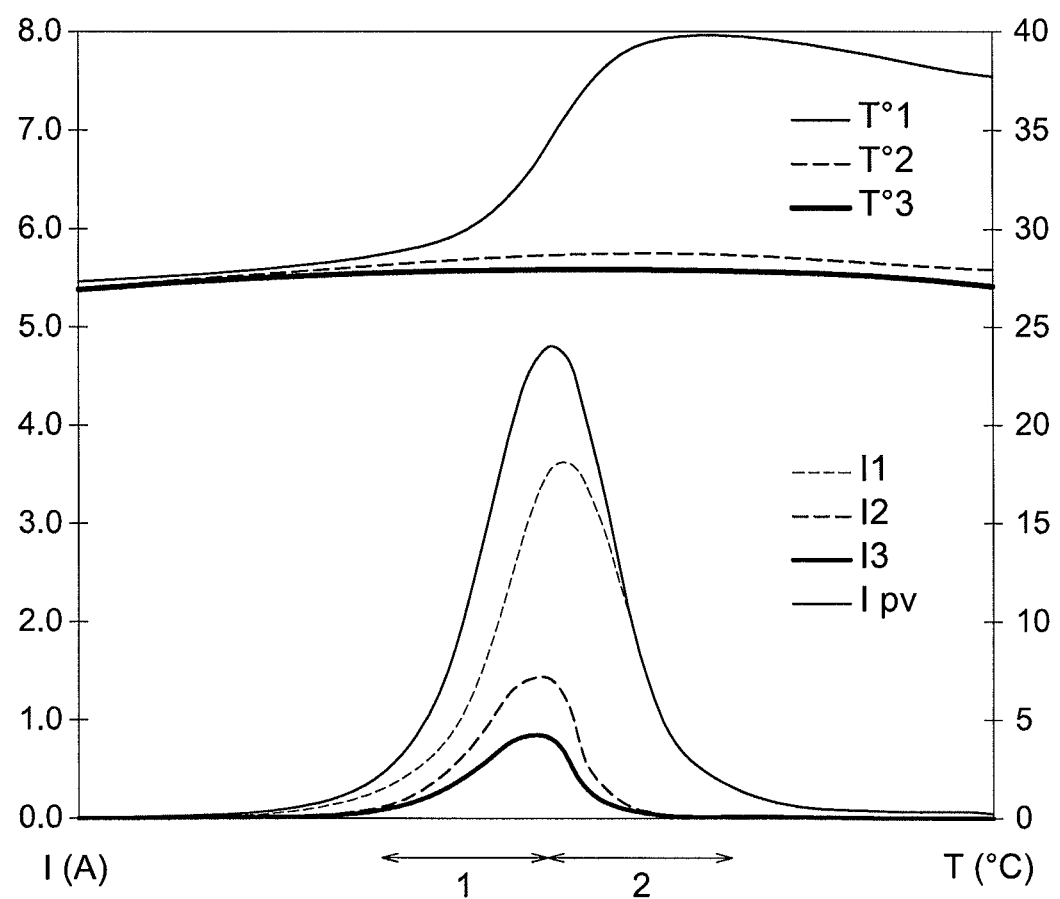
FIG. 1, already described, shows measurements acquired on a prior art photovoltaic 5 system.

FIG. 5 shows the distribution of the charging current between the parallel branches of electrochemical cells of the system of the invention. Like in FIGS. 1 and 3, the curves in the bottom portion of the graph show variation in current over the course of the day. Curve Ipv shows how the current delivered by the solar panel is varying and the curves I1, I2, I3 respectively show the current passing in each of the three branches. The top portion of the graph shows temperature variations in the electrochemical cells.

The graph in FIG. 5 describes four phases in operation of the system:

Phase 1: the current Ipv supplied by the photovoltaic cell panel is being shared out between the three electrochemical cells. The first branch is taking more current than the others as a result of a lower internal resistance for example, and is charging more rapidly. The cell of this branch is consequently heating up more than the others. The control electronics for this branch fix a set value at 2 A.

Phase 2: charging in the first branch is regulated to 2 A as described with reference to FIG. 4. The two other electrochemical cell branches can then take more charging current.

Phase 3: the electrochemical cell of the first branch has become fully charged. Passage of current in this first branch is totally interrupted and charging current can now be fully shared out between the two other branches. Like the case of the first branch, a set value (2 A in the example) regulates charging and limits heating up of the cells in the second and third branches.

Phase 4: the control electronics of the first branch provide trickle charging with a new set value (0.5 A)

The electrical power supply system of the invention hence provides optimum management of charging current supplied from a charger consisting of apparatus for producing electricity from a renewable energy source. The electrical power supply system of the invention also provides full modularity as a function of the needs of the application. Further, regulating the current of charging makes it possible to employ Ni-MH or Ni—Cd type cells in an electrical power supply system employing a charger consisting of apparatus for producing electricity from a renewable energy source. Obviously, the invention is not limited to the embodiments just described by way of example. Notably, the number of branches connected in parallel in the system according to the invention can vary, together with the number of cells connected in series in one branch. Similarly, the charger of the system according to the invention can consist of any source of renewable energy for which the energy available is limited and variable over time.

The invention claimed is:

1. An electrical power supply system comprising:
   a plurality of electrochemical cells,
   a plurality of control electronics circuits and
   a charger made up by apparatus for producing electricity from a renewable energy source, the electrochemical cells being divided into at least two branches connected in parallel to the charger, each control electronics circuit being adapted to control the charging of one branch, each control electronics circuit comprising:
      a means for measuring current being applied to the branch,
      a means for integrating the current measured,
      a means for determining a state of charge of the electrochemical cell or cells of the branch,
      means for comparing the integrated current value with a set value set as a function of the state of charge determined,
      means for interrupting the passage of current being applied to the branch when the integrated current reaches the set value,
      wherein each control electronics circuit adjusts the closure and opening period of said means for interrupting the passage of current in relation to the integrated current value and said set value,
   wherein said system is configured to supply all branches with current simultaneously.

2. The electrical power supply system according to claim 1, wherein the charger comprises at least one photovoltaic cell panel.

3. The electrical power supply system according to claim 1, wherein the charger comprises at least one wind turbine.

4. The electrical power supply system according to claim 1, wherein each charging control electronics circuit is integrated into a housing containing the electrochemical cell or cells of the branch with which it is associated.

5. The electrical power supply system according to claim 1, wherein the set value for each branch is set as a function of characteristics of the charger.

6. The electrical power supply system according to claim 1, wherein each control electronics circuit further includes means for determining the state of health of the electrochemical cell or cells of the branch with which it is associated.

7. The electrical power supply system according to claim 1, wherein each control electronics circuit further includes a means for communicating with a system management circuit.

8. The electrical power supply system according to claim 1, wherein the electrochemical cells are of the nickel metal hydride (Ni-MH) type.

9. The electrical power supply system according to claim 1, wherein the electrochemical cells are of the nickel cadmium (Ni—Cd) type.

10. A method for controlling charging of a plurality of electrochemical cells distributed into at least two branches connected in parallel to a charger consisting of apparatus for producing electricity from a renewable energy source, the method comprising the steps of:

measuring a current being applied to each branch,
integrating the current measured in each branch,
determining a state of charge of the electrochemical cell or cells of each branch;
comparing, for each branch, the value for integrated current with a set value set as a function of the determined state of charge,
adapting, for each branch, a duration of interruption of passage of current in the branch as a function of the set value,
wherein all branches may be supplied with current simultaneously.

11. The method for controlling according to claim 10, wherein the charger comprises at least one photovoltaic cell panel.

12. The method for controlling according to claim 10, wherein the charger comprises at least one wind turbine.

13. The method for controlling according to one of claims 10 to 12, wherein the set value in each branch is set as a function of characteristics of the charger.

* * * * *